(No Model.)

J. W. SIMPSON.
DISK HARROW.

No. 515,132. Patented Feb. 20, 1894.

Witnesses

Inventor
J. W. Simpson
By his Attorneys,

THE NATIONAL LITHOGRAPHING COMPANY,
WASHINGTON, D. C.

UNITED STATES PATENT OFFICE.

JAMES WILLIAM SIMPSON, OF NEW COLUMBUS, KENTUCKY.

DISK HARROW.

SPECIFICATION forming part of Letters Patent No. 515,132, dated February 20, 1894.

Application filed January 10, 1893. Serial No. 457,934. (No model.)

*To all whom it may concern:*

Be it known that I, JAMES WILLIAM SIMPSON, a citizen of the United States, residing at New Columbus, in the county of Owen and State of Kentucky, have invented a new and useful Disk Harrow, of which the following is a specification.

My invention relates to improvements in that class of harrows employing disks; and the objects in view are to provide a harrow so constructed that each disk will be independent of the other and therefore adapted to ride over obstructions that may lie in its path without affecting the companion disks; to arrange for a yielding compression of the disks to their work; for an adjustment of the disks in gangs and to various angles with the line of draft, whereby they are adapted for operating upon ground of various degrees of hardness; and furthermore to arrange for an independent adjustment of the disks with relation to their respective gang-supports whereby they may be depressed more or less in the line of draft.

With these various objects in view the invention consists in certain features of construction hereinafter specified and particularly pointed out in the claims.

Figure 1:
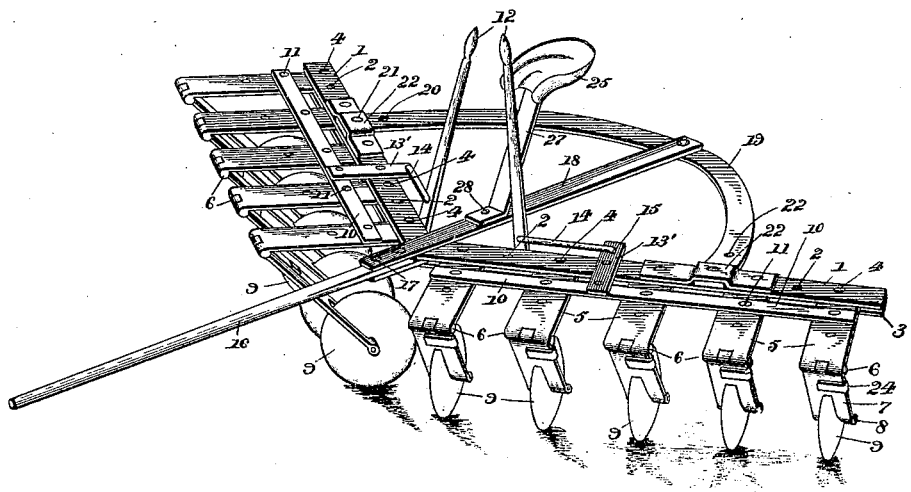
Figure 2:
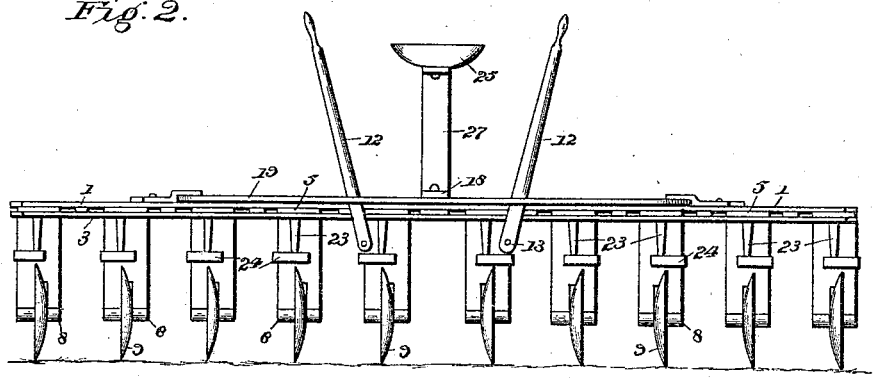
Figure 3:
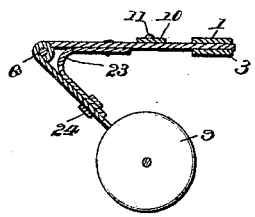

Referring to the drawings:—Figure 1 is a perspective view of a harrow embodying my invention. Fig. 2 is a rear elevation thereof. Fig. 3 is a transverse section of the same.

Like numerals of reference indicate like parts in all the figures of the drawings.

In practicing my invention I employ two opposite gangs, and in each gang there is comprised a pair of harrow-bars or plates 1, the same being connected by rivets 2 to the opposite sides of a union-plate 3. At intervals the harrow-bars are bolted or riveted together, and between the same there is pivoted as at 4 a series of arms 5 horizontally-disposed or nearly so and having hinged at their outer forward or free ends, as at 6, swinging-arms 7, whose lower ends are bifurcated and provided with opposite bearings 8 in which is journaled a series of disks 9. Each series of pivoted arms is connected by a connecting-rod 10, the same being pivoted at its points of intersection with said arms as indicated at 11. Levers 12 are fulcrumed at 13 at the rear side of each of the gangs, and upon the harrow-bars between the levers and arms are pivoted intermediate levers 13', which are connected at their rear ends by rods 14 loosely with the hand-levers before mentioned and at their front ends at 15 with the aforesaid connecting-rods, so as will be obvious, an operation of these hand-levers will cause a lateral or horizontal swinging of the pivoted arms and consequently the disks may be set at any angle desired with relation to the line of draft. A draft-pole 16 is bolted as at 17 to the union-plate, and a reach-bar 18 is by the same bolts secured upon the draft-pole and extends rearwardly. A curved guide-bar 19 is secured at its center to the rear end of the reach-bar and at its terminals which overlap the bars 1 is perforated as at 20 to receive adjusting-pins 21. Keepers 22 are located upon the harrow-bars and loosely receive the ends of the curved guide-bar and are likewise perforated for the reception of the pins. It will thus be obvious that the harrow-bars may be swung laterally upon the guide-bar and by an adjustment of the pins in the various holes in said guide-bar the said harrow-bars may be arranged at different angles to each other. Secured rigidly to the under side of the several pivoted arms are acutely-bent springs 23, whose lower or free ends rest against the lower hinged arms and engage with keepers 24 located upon the upper or rear sides of the said hinged arms, whereby the said springs serve to prevent the hinged arms from closing. This completes the construction, with the exception of a suitable seat 25 which is supported by a standard 27 upon the reach-bar, and it will be observed that this reach-bar is provided with a bolt 28 passed through the foot of the standard, and which serves as a means of adjusting the said standard upon the aforesaid reach-bar. It will be seen that the two hand-levers are within convenient reach of the driver, and he may manipulate the two so as to vary the disks with relation to the line of draft, and thus adapt the same for operating upon the different kinds of soil. In operating upon soft soil the harrows are thrown apart at a greater angle than when operating upon hard soil, in that in the latter instance the harrows are swung together so that the disks will operate upon the soil but a short distance apart. This adjustment of the gangs at a greater or less angle is provided for, it will be observed, through the curved guide-bar and the removable pins for locking the same into engagement with the gangs of harrows.

From the foregoing description it will be seen that I have provided a harrow, the construction of which is such as to adapt it to operate upon different kinds of soil and when operating upon a hard soil the entire weight and action of the harrows may be contracted and adapted to operate upon a small space at a time, whereby the entire action of the harrow is concentrated; and furthermore, that the several gangs of disks may be conjointly and separately attached so as to be disposed at various angles to the line of draft suitable to the character of the soil; and finally that each of the disks is independent of the other in its action upon the soil and in case of meeting with obstructions will yield to the same and immediately resume its operative position and yet not affect the remainder of the series of disks.

Having described my invention, what I claim is—

1. In a harrow of the class described, the combination with a harrow-bar, of arms pivoted to and extending forwardly from said bar, means for horizontally swinging the arms, disk-carrying arms hinged to the outer ends of said arms, and declining rearward therefrom and under the bar and springs interposed between the upper and lower arms, substantially as specified.

2. In a harrow of the class described, the combination with a harrow-bar, of arms extending horizontally and forwardly therefrom, lower arms extending rearward under the bar hinged to the free ends of said arms and carrying disks, and springs interposed between said arms, substantially as specified.

3. In a harrow, the combination with a harrow-bar, of arms extending horizontally and forwardly therefrom, lower arms carrying disks and hinged at their upper ends to said upper arms and extending rearwardly in an inclined manner thereunder and the bar and provided with keepers, and angular springs secured to the upper arms and having their free ends engaging with the keepers of the lower arms, substantially as specified.

4. In a harrow of the class described, the combination with opposite pivoted harrow-bars, pivoted together at their inner ends a reach-bar connected with said pivot of the harrow-bars and extending rearwardly therefrom, and perforated keepers mounted on the harrow-bars, of a curved or semicircular guide-bar secured to the rear end of the reach-bar and having its terminals passed through the keepers and provided with perforations, and adjusting-pins passed through the keepers and perforations of the guide-bar, substantially as specified.

5. The combination with a union-plate, harrow-bars pivoted to the opposite sides of the plate, horizontal arms extending forwardly from and pivoted to each of the harrow-bars, lower disk-carrying arms hinged to the front ends of and inclined rearwardly under said arms, and springs interposed between the said upper and lower arms, of connecting-rods pivotally connected to the upper arms of each series, hand-levers fulcrumed at the sides of the harrow-bars, intermediate levers fulcrumed upon the harrow-bars and at their front ends connected to the connecting-rods, and links connecting the rear ends of said intermediate levers with the said hand-levers, substantially as specified.

In testimony that I claim the foregoing as my own I have hereto affixed my signature in the presence of two witnesses.

JAMES WILLIAM SIMPSON.

Witnesses:
ROBERT JACKSON,
W. W. LEE.